(12) United States Patent
Chanyontpatanakul

(10) Patent No.: US 10,192,205 B2
(45) Date of Patent: Jan. 29, 2019

(54) METHOD FOR PROVIDING A GRAPHICAL USER INTERFACE FOR AN ELECTRONIC TRANSACTION

(71) Applicant: VISA INTERNATIONAL SERVICE ASSOCIATION, San Francisco, CA (US)

(72) Inventor: Yothin Chanyontpatanakul, Foster City, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 913 days.

(21) Appl. No.: 14/292,114

(22) Filed: May 30, 2014

(65) Prior Publication Data
US 2015/0347992 A1 Dec. 3, 2015

(51) Int. Cl.
*G06Q 20/10* (2012.01)
*G06Q 20/12* (2012.01)
*G06F 3/0484* (2013.01)
*G06Q 20/22* (2012.01)
*G06Q 20/42* (2012.01)
*G06F 3/0482* (2013.01)

(52) U.S. Cl.
CPC .......... *G06Q 20/10* (2013.01); *G06F 3/0482* (2013.01); *G06F 3/04842* (2013.01); *G06Q 20/12* (2013.01); *G06Q 20/227* (2013.01); *G06Q 20/42* (2013.01)

(58) Field of Classification Search
None
See application file for complete search history.

(56) References Cited

U.S. PATENT DOCUMENTS

| | | | | |
|---|---|---|---|---|
| 6,310,634 B1* | 10/2001 | Bodnar | ............... | G06F 3/0236 715/777 |
| 2003/0103072 A1* | 6/2003 | Ko | ............... | G06F 3/04895 715/710 |
| 2011/0068170 A1* | 3/2011 | Lehman | ............... | G06Q 30/02 235/380 |
| 2013/0054470 A1* | 2/2013 | Campos | ............... | G06Q 20/36 705/67 |
| 2013/0238455 A1* | 9/2013 | Laracey | ............... | G06Q 20/108 705/21 |

* cited by examiner

Primary Examiner — Joseph W. King
(74) Attorney, Agent, or Firm — Loeb & Loeb LLP

(57) ABSTRACT

The method provides a graphical user interface for an electronic transaction. An input screen is displayed in the shape of an electronic transaction device and inputs in fields of the electronic transaction device are received. If each of the one or more fields has been completed, an indication to move to an additional display of the electronic transaction device is shown. Second inputs in additional fields of the additional display are received. If each of the additional fields has been completed, an additional indication to move to a confirmation display is displayed, and the confirmation display is shown.

20 Claims, 23 Drawing Sheets

Thank you for your order!

Summary for order number 17BLQKIDN

| Ship To |
|---|
| John Smith<br>1234 12th Street<br>San Francisco, CA 55555 |

| Item | Size | Price | Qty | Total |
|---|---|---|---|---|
| Bowery supersoft crew T<br>6044292320005 | XXL | $19.95 | 1 | $19.95 |

| Summary of Charges | |
|---|---|
| Order Subtotal: | $19.95 |
| Promotions: | -$2.50 |
| Shipping & Handling: | $7.00 |
| Tax: | $2.50 |
| Order Total: | $26.95 |

| Payment Info | |
|---|---|
| Paid with Card | XXXX XXXX XXXX 0910 |

FIG. 14

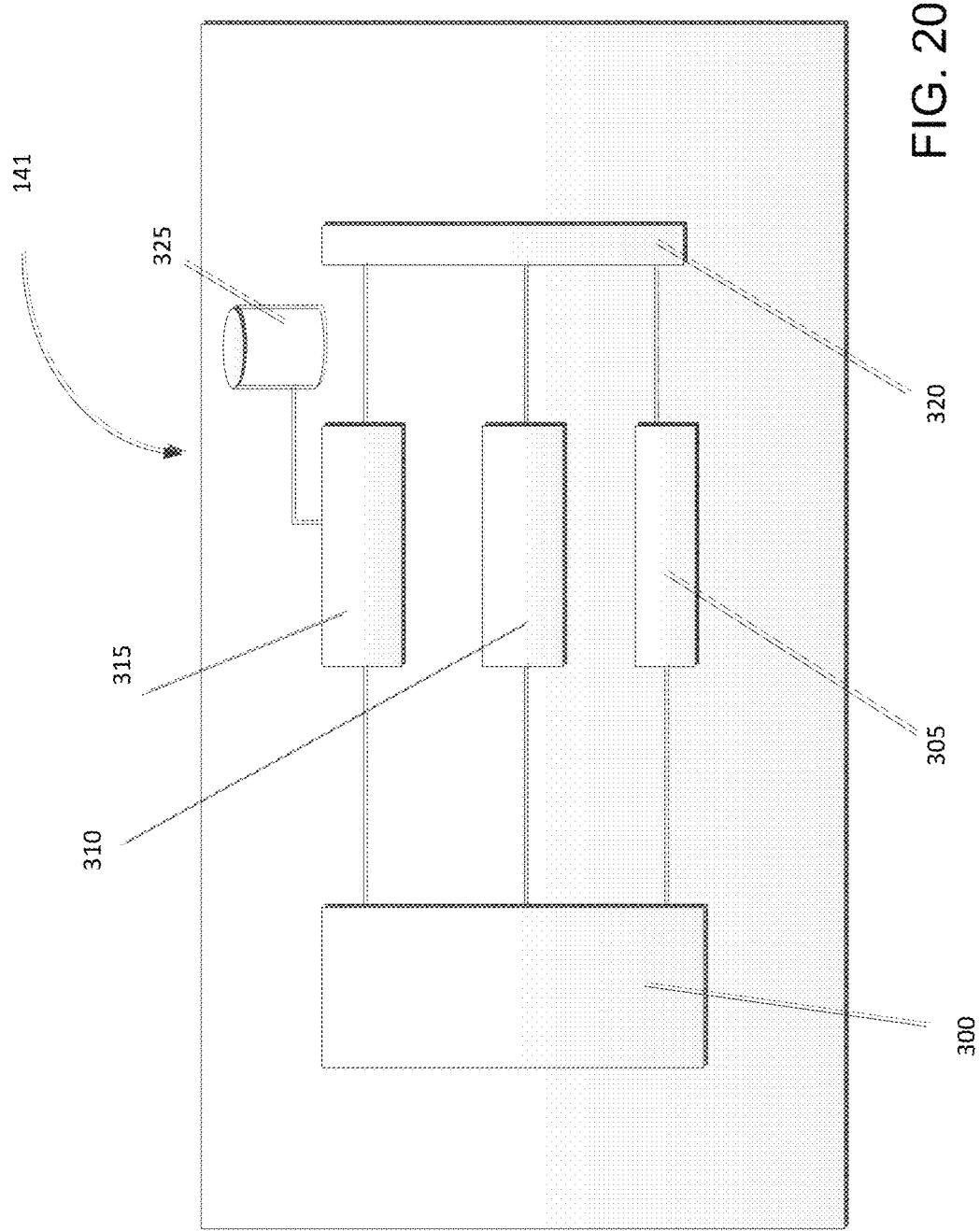

METHOD FOR PROVIDING A GRAPHICAL USER INTERFACE FOR AN ELECTRONIC TRANSACTION

BACKGROUND

Instead of presenting a physical credit or debit card for a purchase, it is now possible to conduct an entire transaction via mobile applications or web browsers. Many issuers, payment processors, and merchants provide loyalty programs and other membership opportunities for consumers. Electronic transactions require the consumer to navigate through multiple menu screens in order to conduct a transaction. Consumers often associate their payment accounts based on the appearance of the physical payment cards. Navigation through these multiple menu screens fail to create visual ties to the consumer's physical payment cards and membership cards.

SUMMARY

Disclosed is a method for providing a graphical user interface of an electronic transaction including displaying an input screen in the shape of an electronic transaction device. The method further receives first inputs in one or more fields of the electronic transaction device and displays an indication to move to an additional display if each of the one or more fields has been completed. The method further includes receiving second inputs in additional one or more fields of the additional display wherein the additional display is in the form of the electronic transaction device. The method also includes displaying an additional indication to move to a confirmation display if each of the additional one or more fields has been completed and displaying the confirmation display.

BRIEF DESCRIPTION OF THE DRAWINGS

FIG. 14 is an illustration of a sample display for transaction information;

FIG. 20 is an illustration of a server type computing device which is physically configured according to the embodiments of the method.

SPECIFICATION

A method for providing a graphical user interface for an electronic transaction is disclosed. Many purchasers have multiple accounts that use physical cards to make purchases. These cards may indicate the merchant, payment provider, and/or issuer and other details associated with each account. The look and design of the physical card is a powerful visual tool that allows the purchaser to recognize the account virtually instantaneously without reading the account numbers on the card. Purchasers can often personalize their physical cards by selecting a background image, color, or providing their personal image for printing on the card. A goal of the invention is to provide this powerful visual tool in an aesthetically pleasing way during an electronic transaction. A further goal of the invention is to provide an attractive, visual tie between the physical card of the user and an entirely electronic transaction. A further goal of the invention is to provide a method that assists the user in identifying and/or distinguishing his user accounts quickly. The term "purchaser" is used herein interchangeably with the term "user."

The method provides an aesthetically pleasing graphical user interface that aids a user in conducting an electronic transaction. The provided display screens facilitate a transaction between the user and a merchant for a transaction. Information selected or entered by the user may be sent via a payment network to complete a transaction such as a purchase, return, or other transaction. The graphical user interface is designed so that the interactive screens are displayed in the shape of an electronic transaction card. The graphical user interface display screen may be sized and shaped such that the graphic user interface has the approximate size and proportions of a credit card or other electronic transaction card. In various screens of the graphical user interface, some or all of image of the electronic transaction card may correspond to either the front or the back of an existing physical card of the user that corresponds to the user's payment information selected or input by the user.

Figure 2:
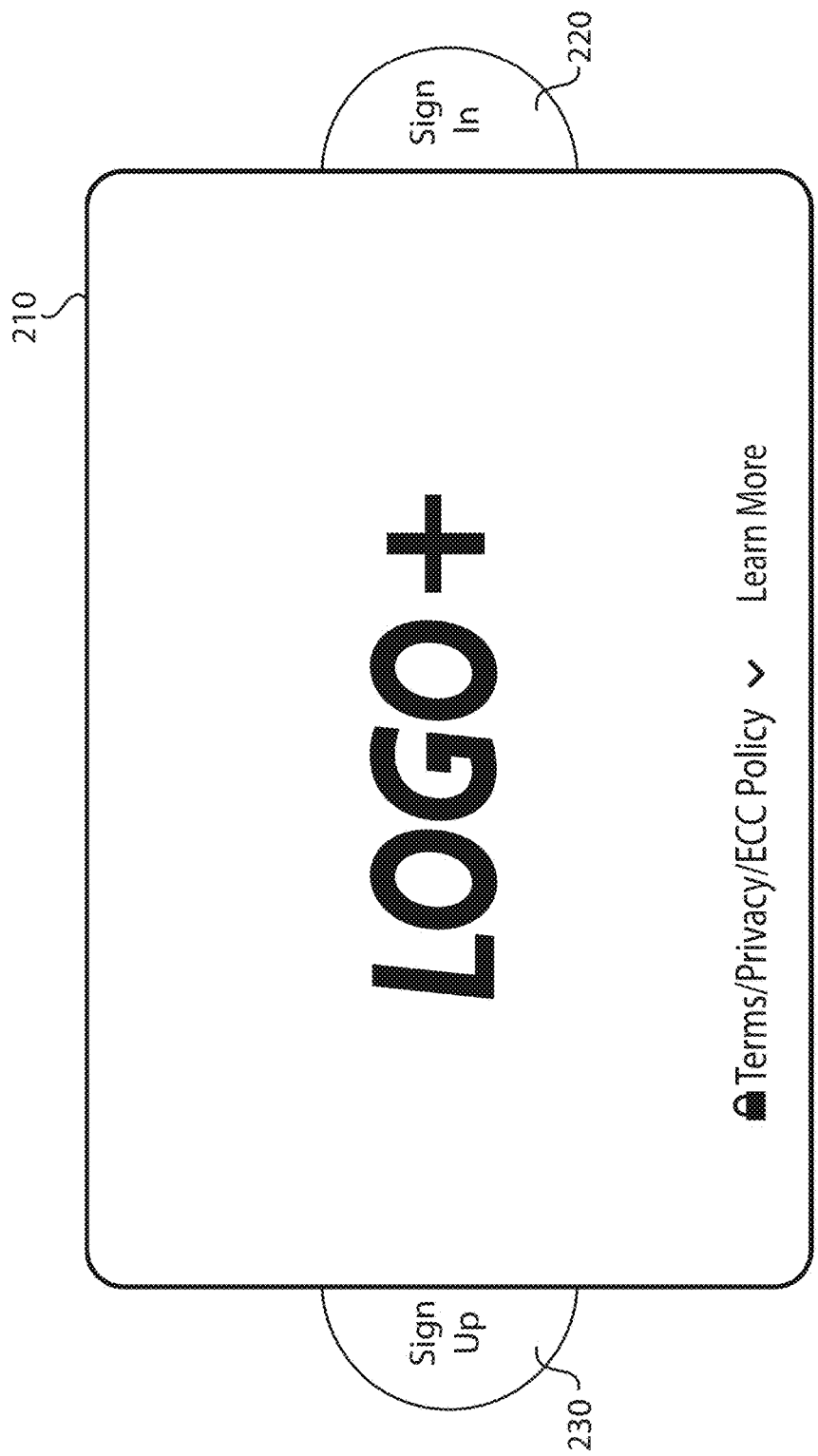
FIG. 2 is an illustration of a sample display providing a sign-up screen.
Figure 3:
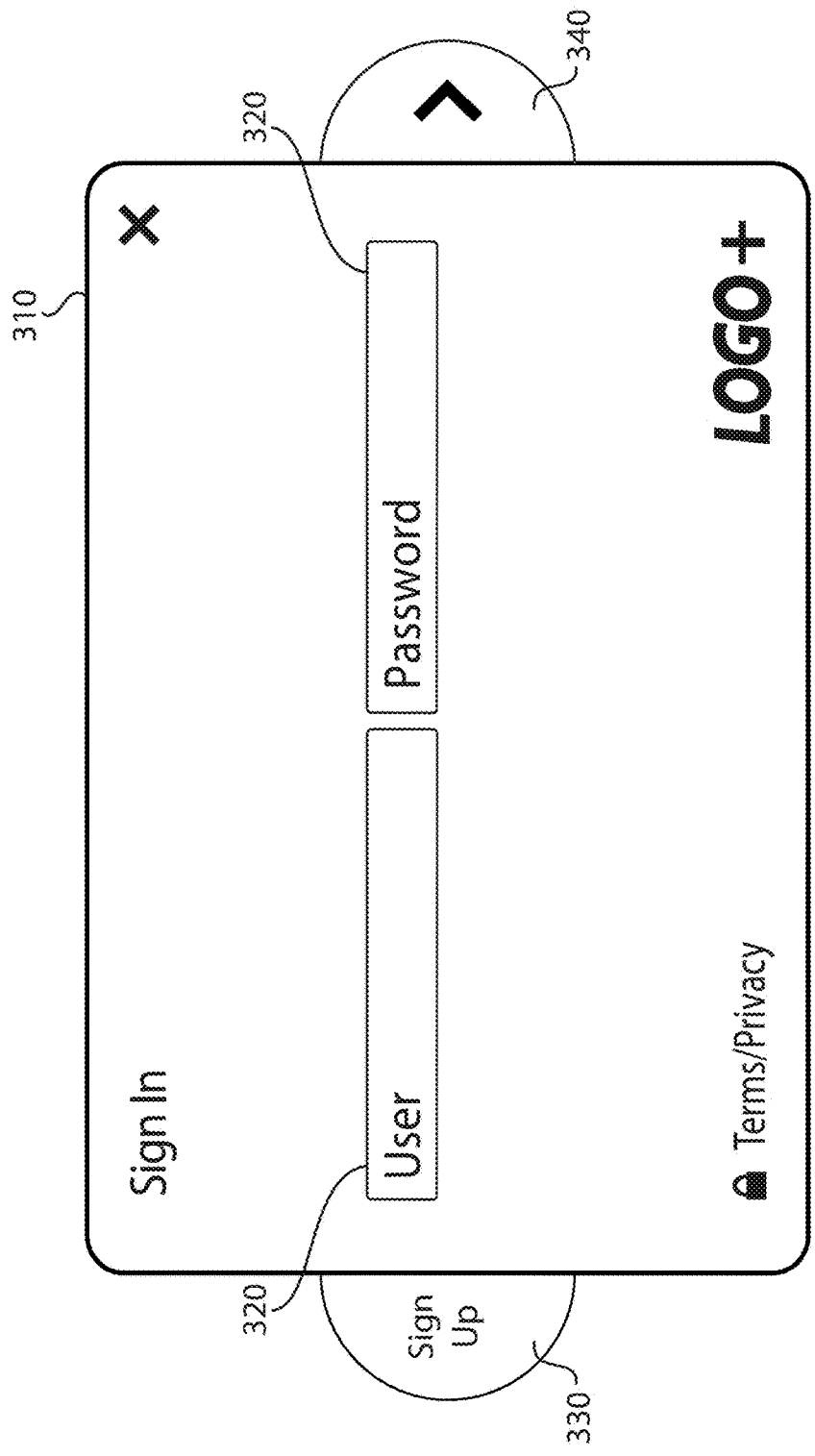
FIG. 3 is an illustration of a sample display providing a sign-in screen.
Figure 4:
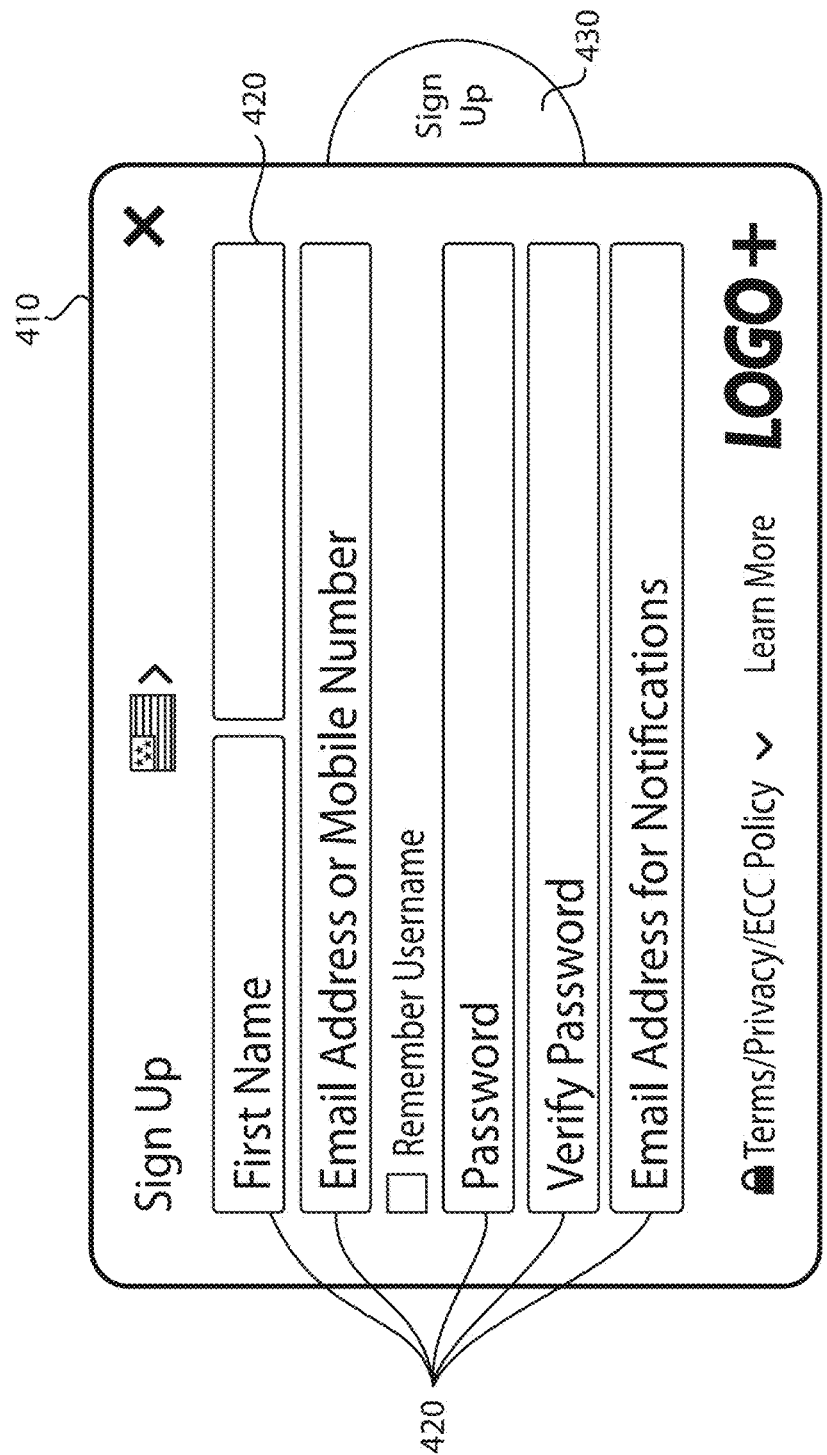
FIG. 4 is an illustration of a sample display providing a sign-up input screen.
Figure 5:
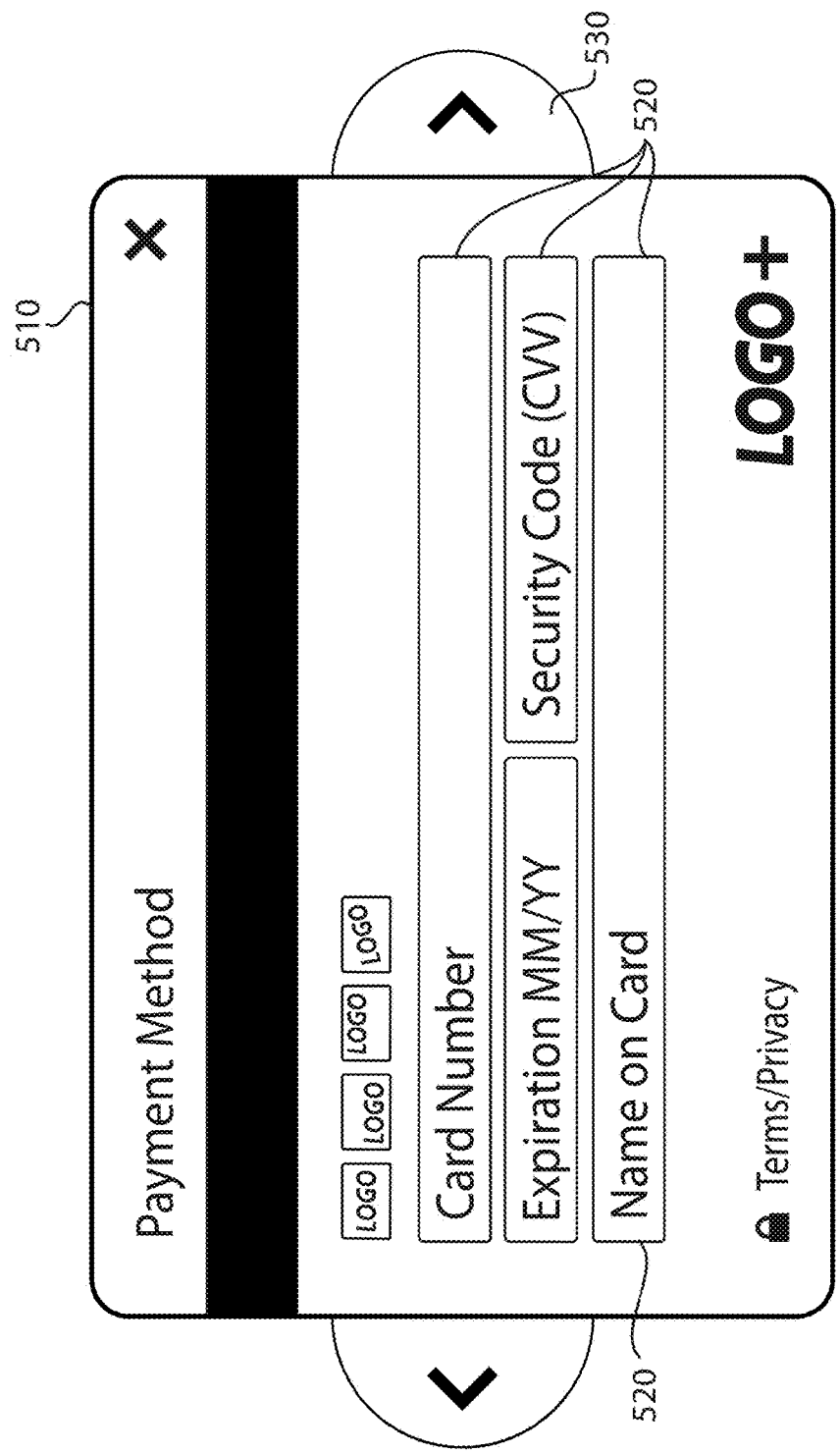
FIG. 5 is an illustration of a sample display providing an input screen for payment information.
Figure 6:
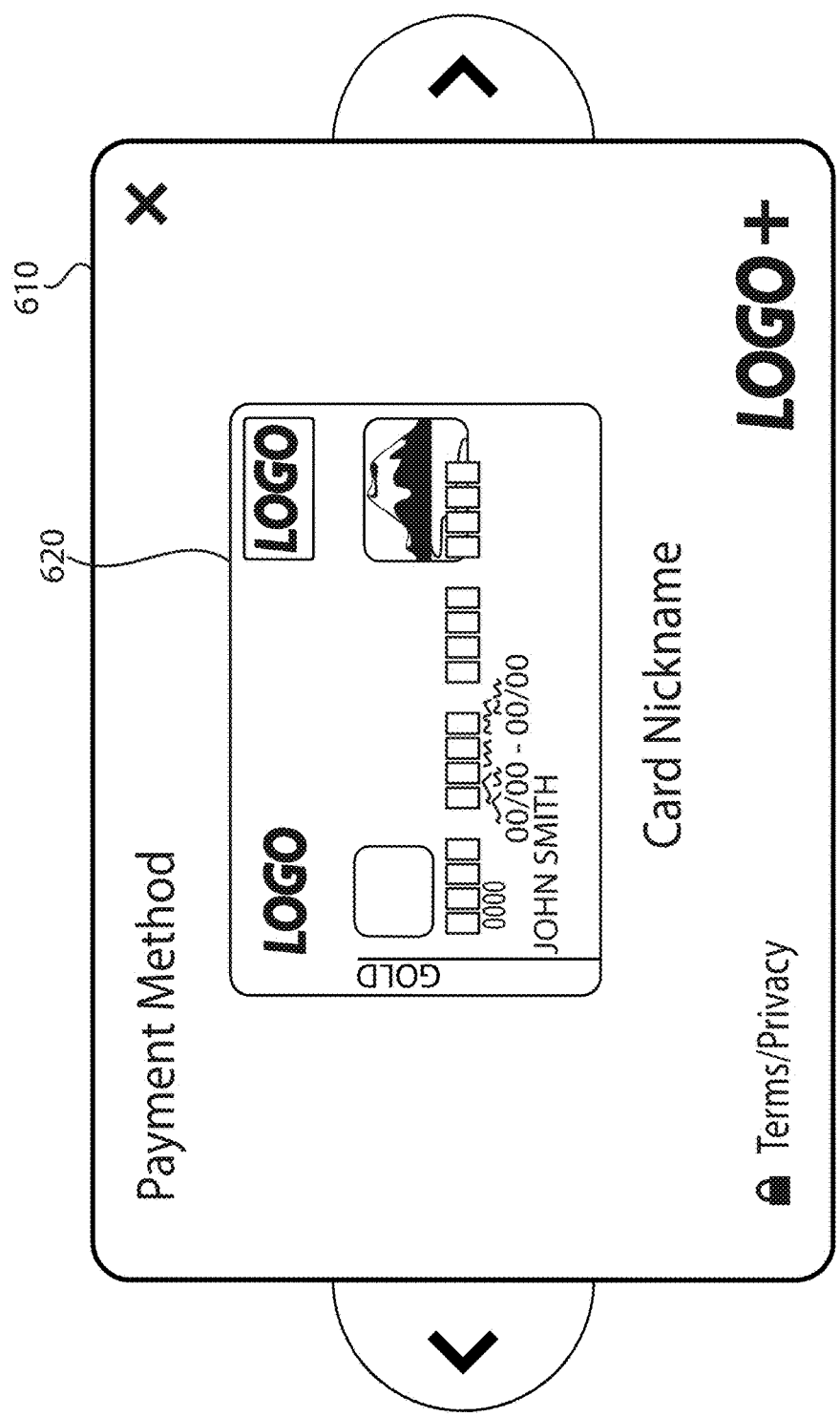
FIG. 6 is an illustration of a sample display for payment information.
Figure 7:
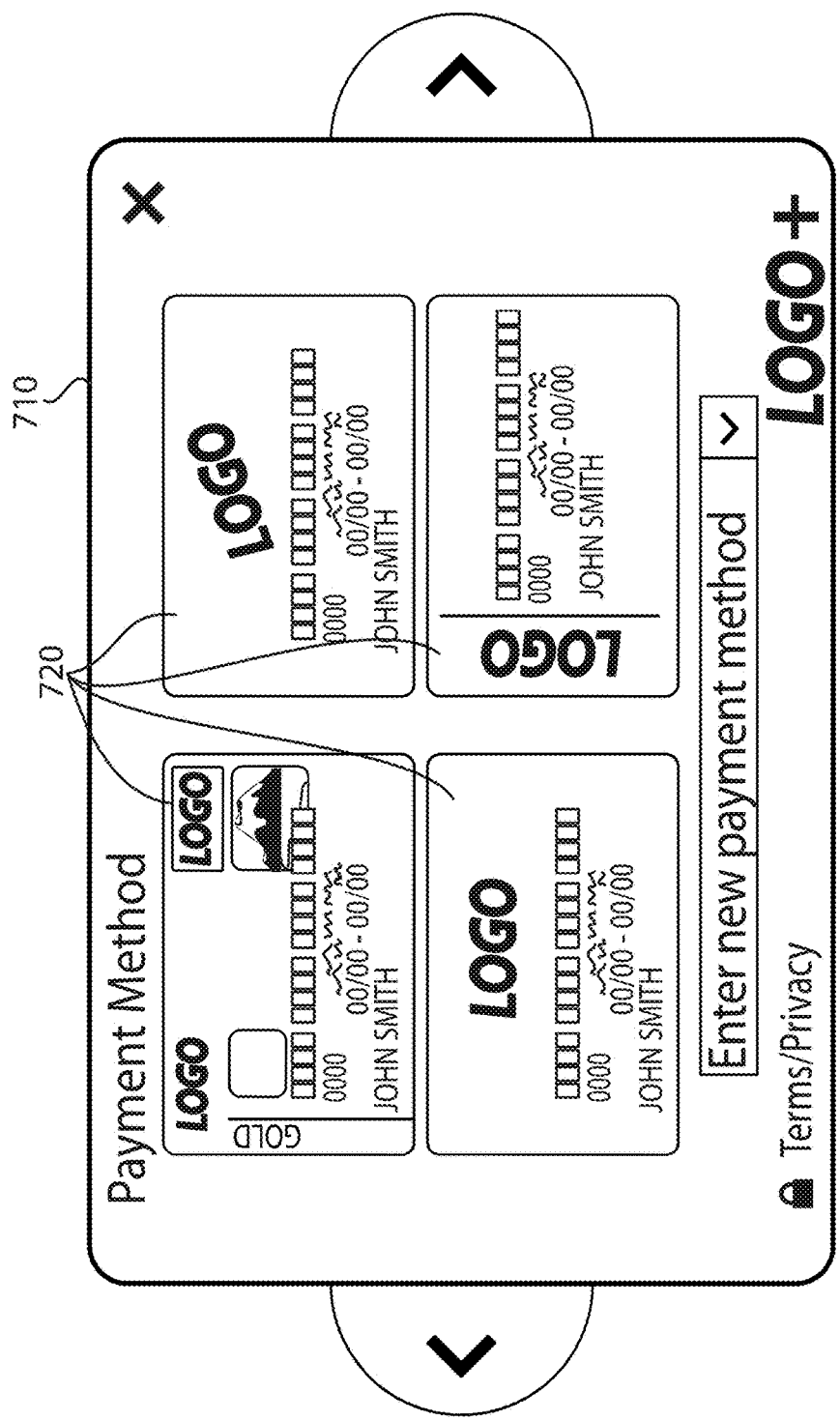
FIG. 7 is an illustration of a sample display for payment information.
Figure 8:
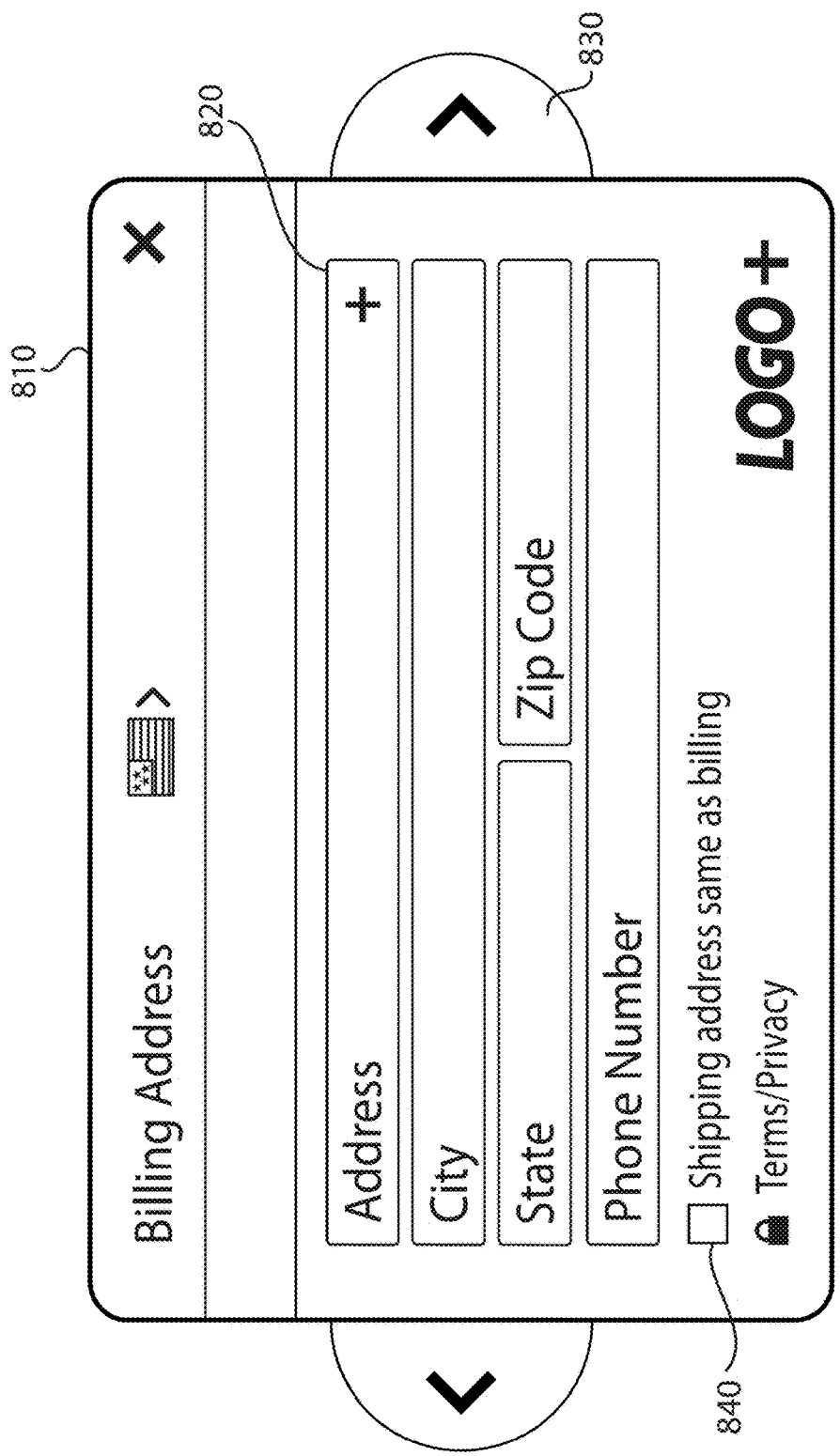
FIG. 8 is an illustration of a sample display providing an input screen for billing address information.
Figure 9:
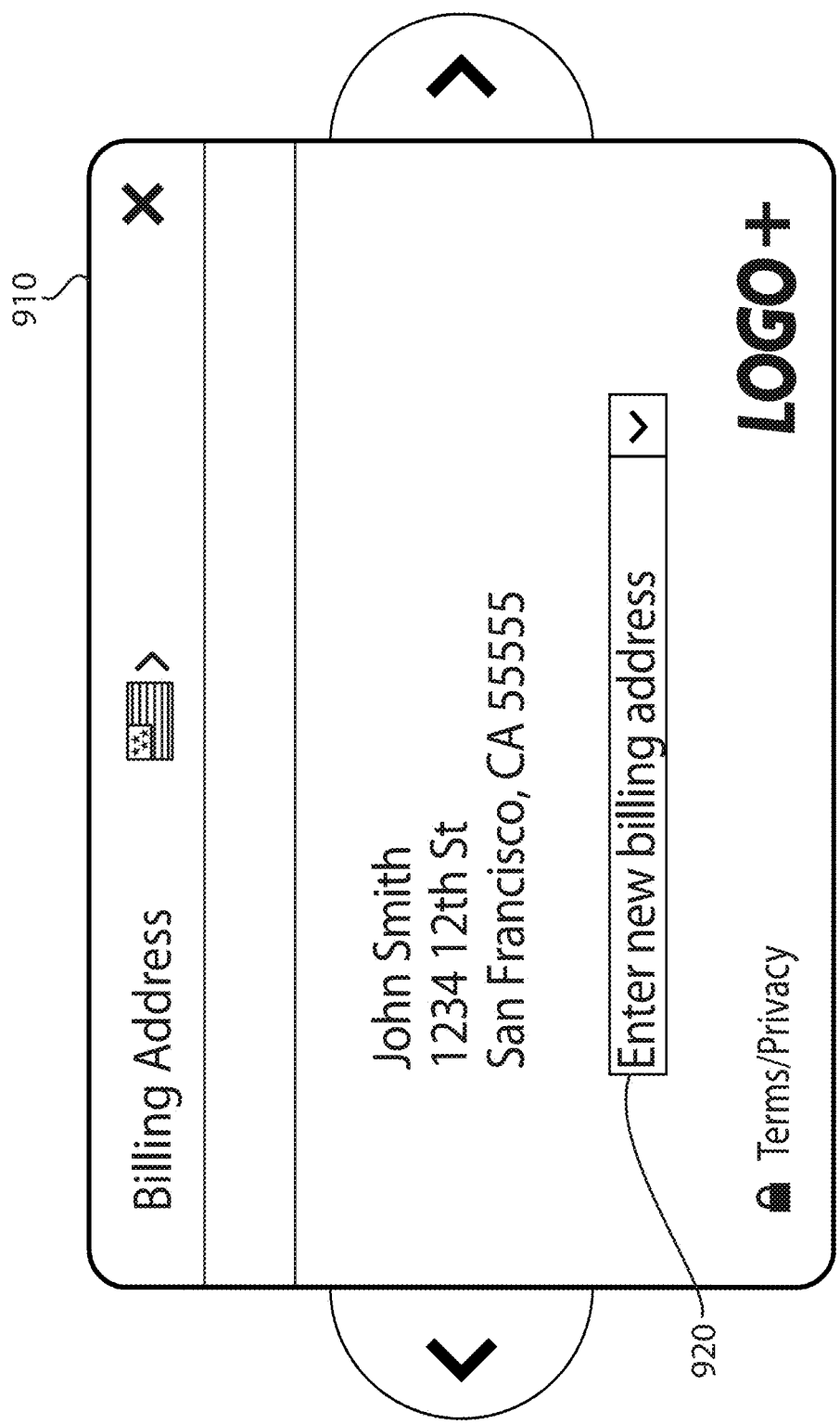
FIG. 9 is an illustration of a sample display for billing address information.
Figure 10:
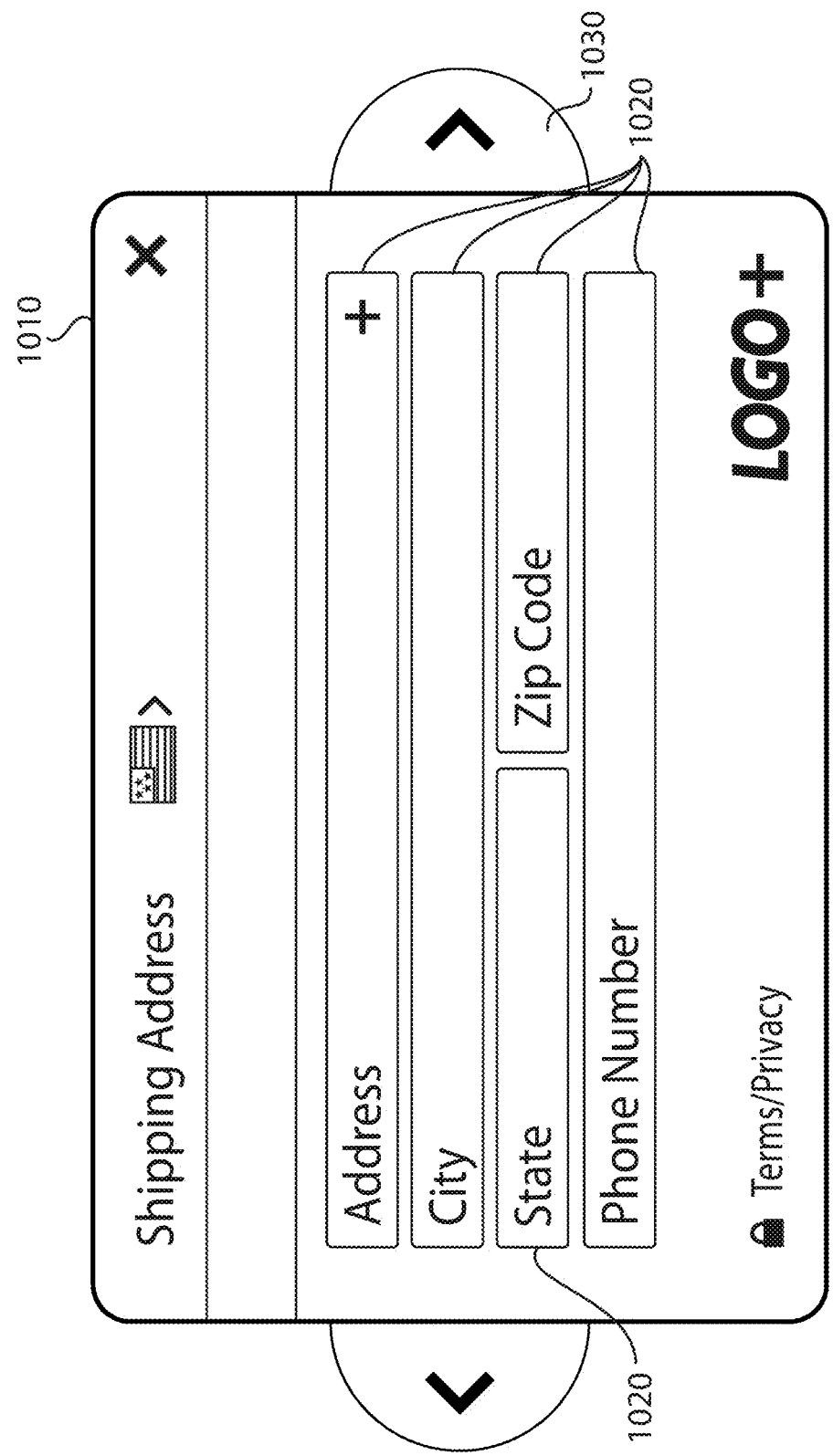
FIG. 10 is an illustration of a sample display for providing an input screen for shipping address information.
Figure 11:
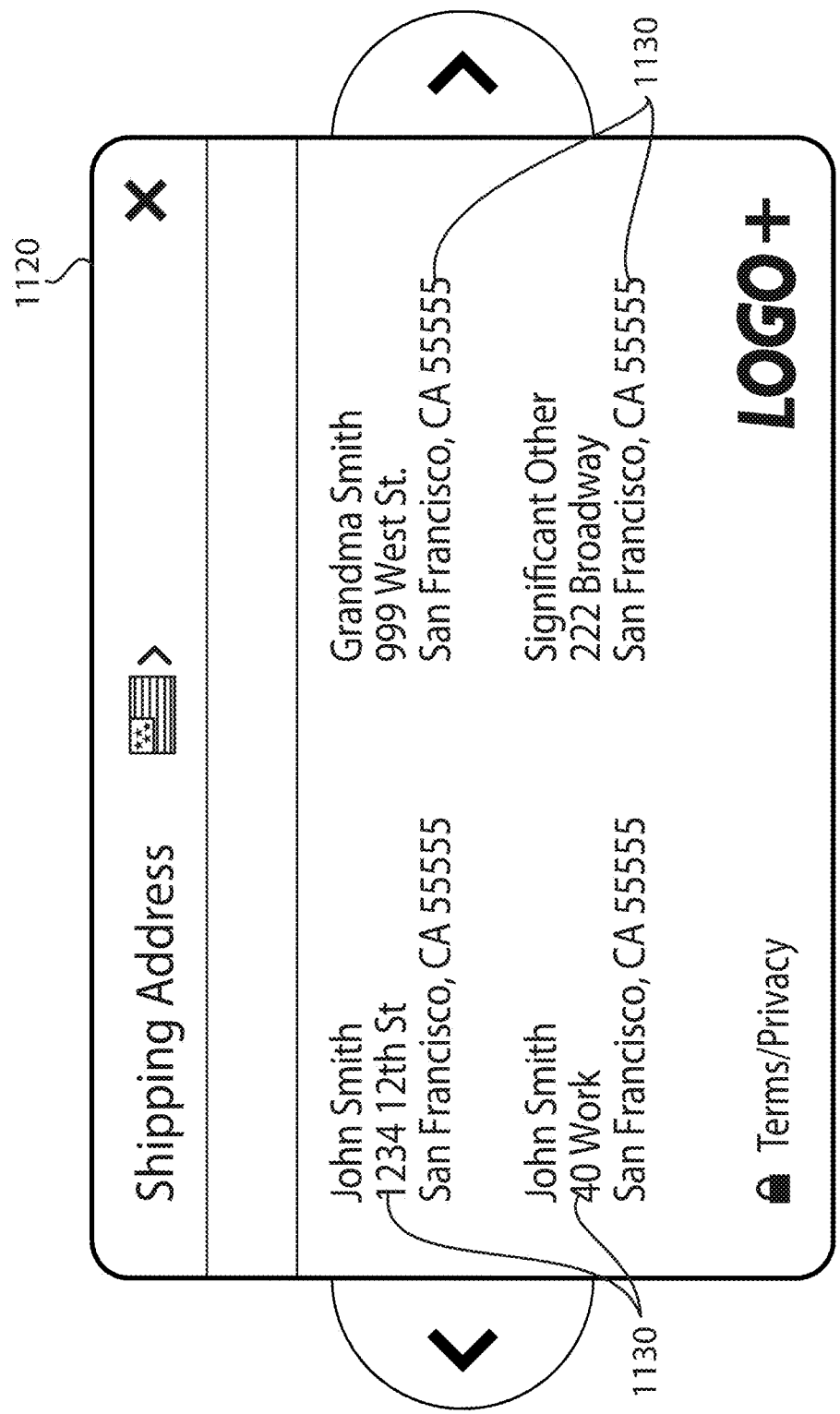
FIG. 11 is an illustration of a sample display for shipping address information.
Figure 12:
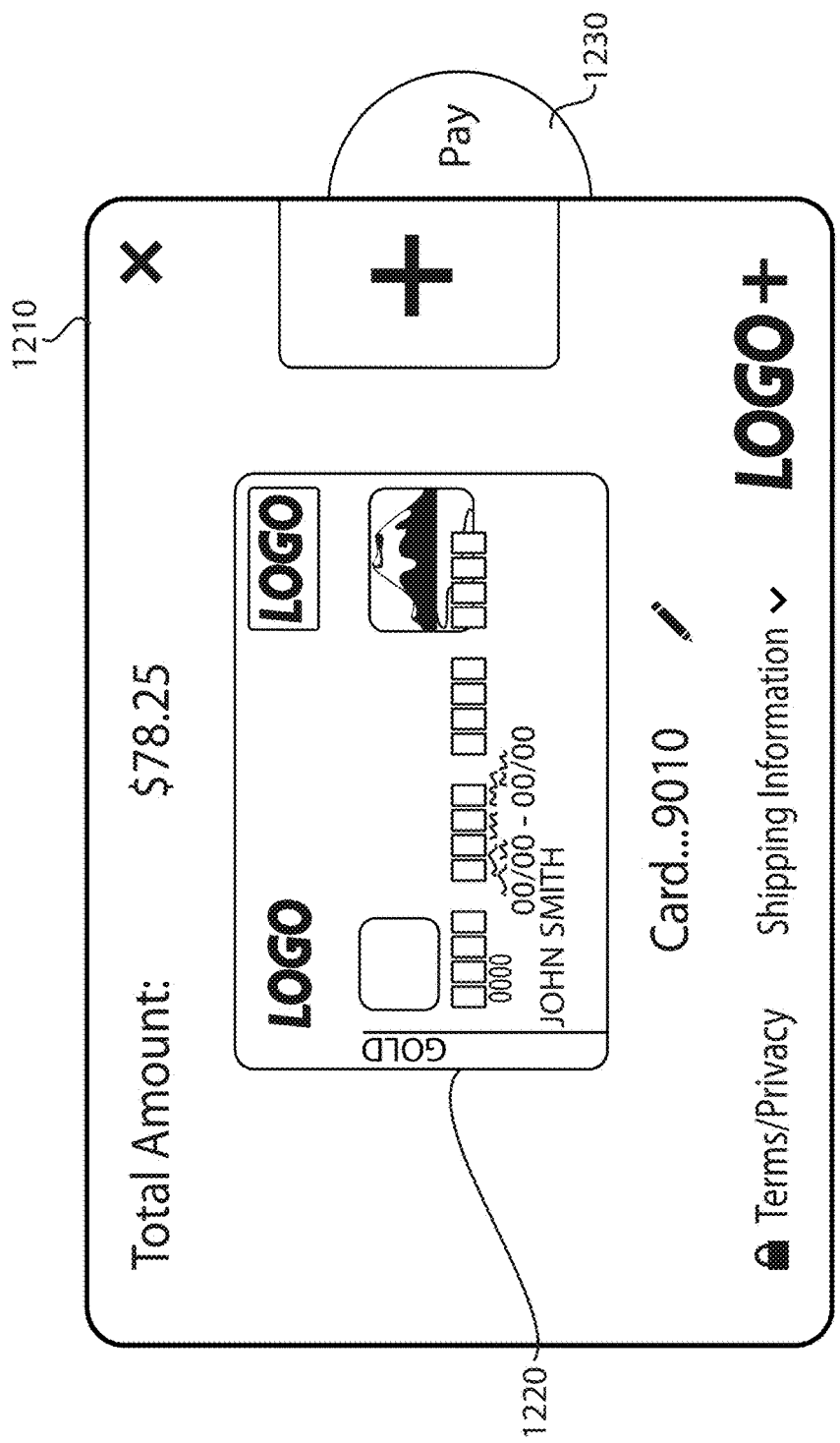
FIG. 12 is an illustration of a sample display for transaction information.

The method provides a graphical user interface to allow the user to interact with all aspects of the electronic transaction experience from start to finish. FIGS. 2-16 depict exemplary graphical user interface screens that are ordered in such a way as to represent the general flow of a transaction experience, although various combinations of the figures are represented by various embodiments of the invention. Some figures provide alternative screens to other figures, so not all the provided figures may be used in some embodiments. It is further contemplated that the general flow of a transaction experience may include many variations. FIGS. 2-4 correspond with exemplary screens associated with graphical user interfaces for user sign-up and sign-in. FIGS. 5-7 correspond with exemplary screens associated with entering or selecting a payment method for a transaction. FIGS. 8 and 9 correspond with exemplary screens associated with entering or selecting a billing address. FIGS. 10 and 11 correspond with exemplary screens associated with entering or selecting a shipping address. FIGS. 12-16 correspond with various screens providing an opportunity for the user to review previously entered or selected information, information about the transaction, and/or information about completed transactions.

Figure 1:
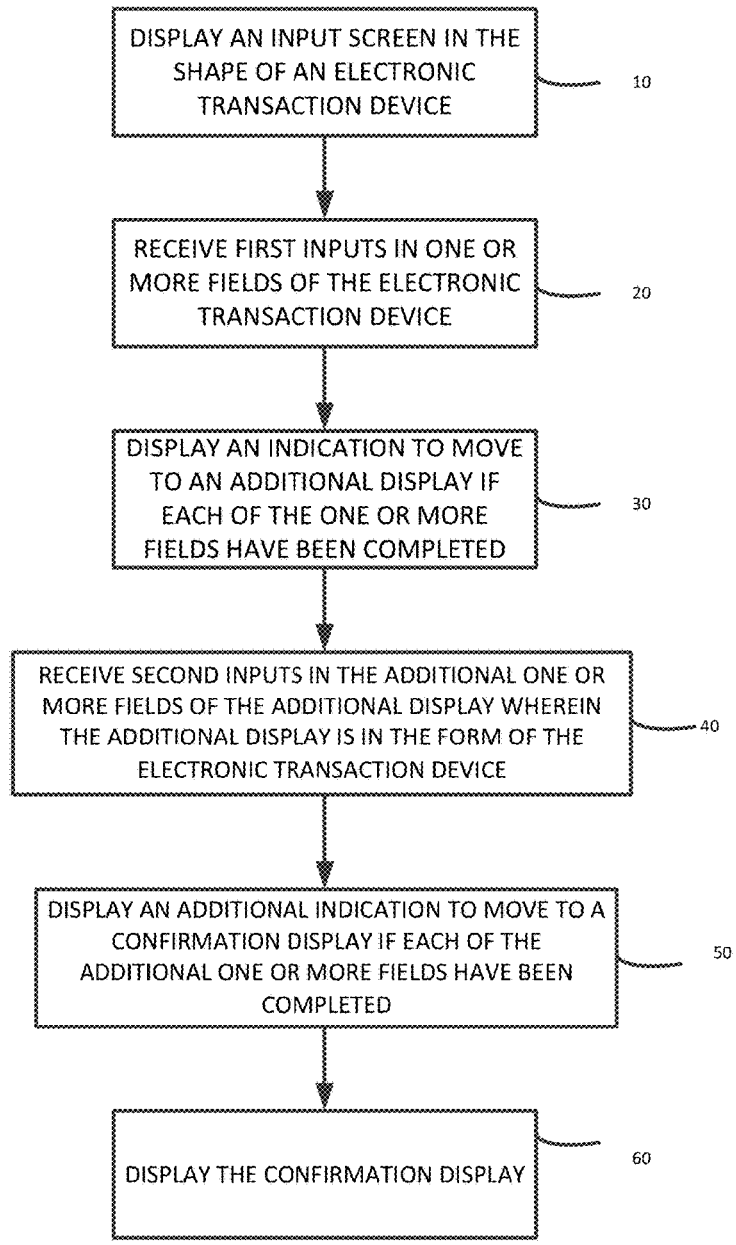
FIG. 1 is a flow diagram illustrating a method in accordance with an embodiment of the subject technology.

FIG. 1 is a flow diagram illustrating a method in accordance with an embodiment of the subject technology for providing a graphical user interface for an electronic transaction. It is understood that the hierarchy of blocks, which include blocks of the method, may be rearranged, and that it is not necessary that all illustrated method blocks be performed. Some method blocks may be performed simultaneously. Additional blocks and/or intermediate blocks may be included in the method without departing from the scope of the subject technology. At block 10, an input screen is displayed in the shape of an electronic transaction device. An example of the input screen at block 10 is the input screen 510 for payment information of FIG. 5. The input screen 510 is illustrated as the back of an electronic transaction device such as a credit card, debit card, checking card, smart card, or loyalty card. Each input screen in the method may be representative of such an electronic transaction device. The represented transaction device may correspond with the look and feel of a physical card that is associated with the same user account. The size of the input screen may be sized and shaped similarly to the corresponding physical card. The input screen may provide fields 520 for user input that are associated with a payment method corresponding to a user account. Example inputs may be card number, expiration date, security code, and name of the user that corresponds with a user's payment account such as a credit card, debit card, loyalty card, or membership card. Card information may represent checking accounts, banking accounts, investment accounts, prepaid cards and other value bearing accounts. Input fields may include additional fields than the fields illustrated in FIG. 5 Any additional fields may be included in order to facilitate a transaction. The input screen may prefill some or all the information for the user, or the input screen may provide suggestions as the user begins to type information into the card.

At block 20, first inputs may be received in one or more fields 520 of the electronic transaction device. At block 30, an indication may be displayed to move to an additional display if each of the one or more fields 520 have been completed. An example of an indication to move to an additional display may be provided by arrow 530. The arrow 530 may initially be displayed in one color and change colors when some or all fields have received input. Alternatively, the arrow 530 may provide an indication to move to an additional display by only appearing upon completion of some or all of the fields. If any received inputs are incomplete, an error message may be displayed instead of the indication to move to an additional display. An error message may indicate that input has not been received in a field that has been designated as required input, that no user account has been identified that matches the received input, or that an input field has only been partially completed. The error message may include an identification of the error.

At block 40, second inputs may be received in the additional one or more fields of the additional display wherein the additional display is in the form of the electronic transaction device. An example of an additional display with fields for second inputs is shown in FIG. 8. The input screen 810 may provide fields 820 for user input that are associated with a billing address. Input fields may include additional fields than the fields illustrated in FIG. 8. Any additional fields may be included in order to facilitate a transaction. The information input by the user may be the billing address information associate with the payment account information entered in fields 510. The input screen may provide field 840 which allows the user to choose whether the shipping address information is the same as the billing address information.

At block 50, an additional indication may be displayed to move to a confirmation display if each of the additional one or more fields have been completed. Arrow 830 is an example of an additional indication to move to a confirmation display if each of the one or more fields 820 has been completed. The arrow 830 may initially be displayed in one color and change color when some or all fields have received input. Alternatively, the arrow 830 may provide an indication to move to an additional display by only appearing upon completion of some or all of the fields. By selecting the arrow 830, the user may be providing an indication to complete a transaction, thus providing an authorization for the user's account to be used to conduct a transaction such as a purchase.

Figure 13:
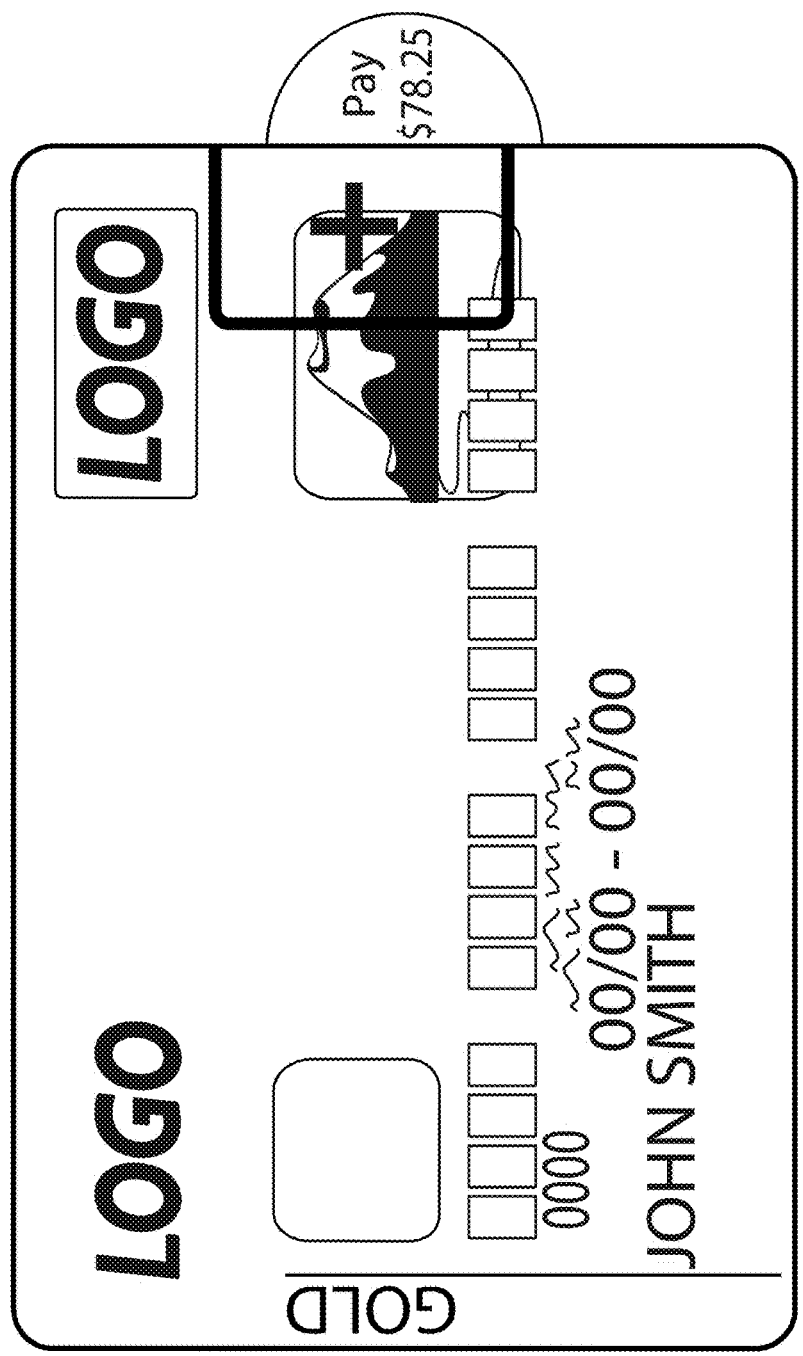
FIG. 13 is an illustration of a sample display for transaction information.
Figure 15:
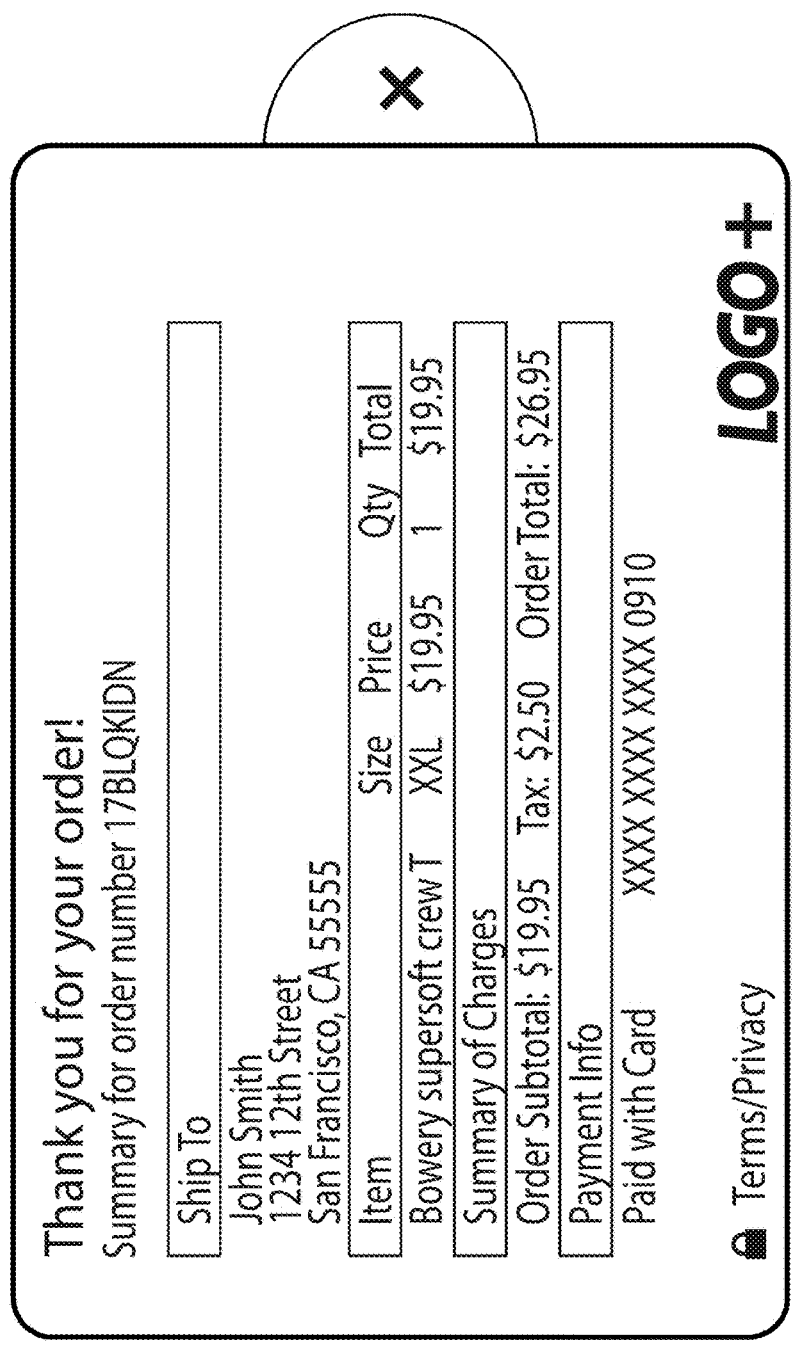
FIG. 15 is an illustration of a sample display for transaction information.

At block 60, a confirmation display may be displayed. An example of a confirmation screen is shown in FIG. 14. Yet another example of a confirmation screen is shown in FIG. 15. In still yet other embodiments, multiple confirmation screens may be displayed to the user. An indication of completed input fields may first be provided as a confirmation of the entered information. An example of such a confirmation screen 1210 is provided in FIG. 12. An image of the card 1220 identified by the payment and billing address information provided in the input fields may be displayed on confirmation screen 1210. The image of the card 1220 may correspond with the physical card associated with the input information. The amount of the transaction may also be displayed on confirmation screen 1210. The transaction may be completed by user selection of the pay indicator 1230. An alternative confirmation screen is also shown in FIG. 13.

In order to provide efficiency to the user for regular use of the graphical user interface, the method of the subject technology may additionally provide displays allowing the user to sign up for a user account. FIG. 2 is an illustration of a sample display providing a sign-up screen. Screen 200 may be the first screen displayed to a user in order to complete a transaction. This screen may appear as a new window once a user has selected items for purchase or after any other initiation of a transaction through a web browser or via an application. Alternatively, this screen may be displayed on the user's desktop allowing the user to interact with the screens at any time in the form of an applet. The size and shape of the screen may be representative of an electronic transaction device and may further include a sign-in indicator 220 and a sign-up indicator 230, which the user may select to proceed with a transaction. The user may select sign in sign-up indicator 230 to navigate to a sign-up screen if the user has not yet created an account. Upon selection of interactive sign in sign-up indicator 230, a sign-up screen may be displayed.

An example of a sign-up screen is shown in FIG. 4, which is an illustration of a sample display providing a sign-up input screen. The input screen 410 may provide fields 420 for user input that provide identification and contact information for the user. The user input information may then be used to associate existing credit cards, debit cards, checking account, savings account, or membership information with the new user account. If the user has already created a user account, sign-in indicator 220 may be selected to proceed with the existing user account. An additional indication to move to a confirmation display may be displayed if each of the additional one or more fields has been completed. An example of an additional indication to move to a confirmation display if each of the one or more fields 420 has been completed may be provided by sign-up indicator 430. The sign-up indicator 430 may initially be displayed in one color and change color when some or all fields have received input. Alternatively, the sign-up indicator 430 may provide an indication to move to an additional display by only appearing upon completion of some or all of the fields.

Referring again to FIG. 2, a sign-in screen may be displayed upon selection of sign-in indicator 220. An example of a sign-in screen is shown in FIG. 3. The input screen 310 may provide fields 320 such that the user may enter her previously created user name and password. The arrow 340 may provide an indication that fields 320 have been completed as well as allow the user to navigate to the next screen. After logging into an existing user account, a default payment method may be displayed to the user. FIG. 6 is an illustration of a sample display for payment information that may represent a default payment method. Alternatively, all the payment methods that have been previously associated with the existing user account may be displayed to the user. FIG. 7 is an illustration of a sample display for payment information. The screens 610 and 710 may display images of existing electronic transaction cards representing cards 620 and 720. The images of cards 620 and 720 may correspond to the existing physical cards of the user. Cards 620 and 720 may be selectable so that the user may select a card for the transaction. Similarly, a default billing address may be associated with an existing user account. FIG. 9 is an illustration of a sample display for default billing address information. Default billing address screen 910 may include drop down box 920 to enter a new billing address.

In some embodiments of the subject technology, if an indication that the billing address is not the same as the shipping address is not received (such as in input field 840), an additional screen may be displayed providing input fields for shipping address information. An example an additional display with fields for second inputs is shown in FIG. 10. The input screen 1010 may provide fields 1020 for user input that are associated with a shipping address. An additional indication may be displayed to move to a confirmation display if each of the one or more fields has been completed. An example of an additional indication to move to a confirmation display if each of the one or more fields 1020 has been completed may be provided by arrow 1030. The arrow 1030 may initially be displayed in one color and change color when some or all fields have received input. Alternatively, the arrow 1030 may provide an indication to move to an additional display by only appearing upon completion of some or all of the fields. By selecting the arrow, the user may be providing an indication to complete a transaction, thus providing an authorization for the user's account to be used to conduct a transaction such as a purchase. For a user with an existing account, multiple shipping addresses may be associated with the user's account. An example of a screen 1120 providing a display of associated shipping address information is provided in FIG. 11. The display may provide multiple addresses 1130 that may be selected as the shipping address information.

Figure 16:
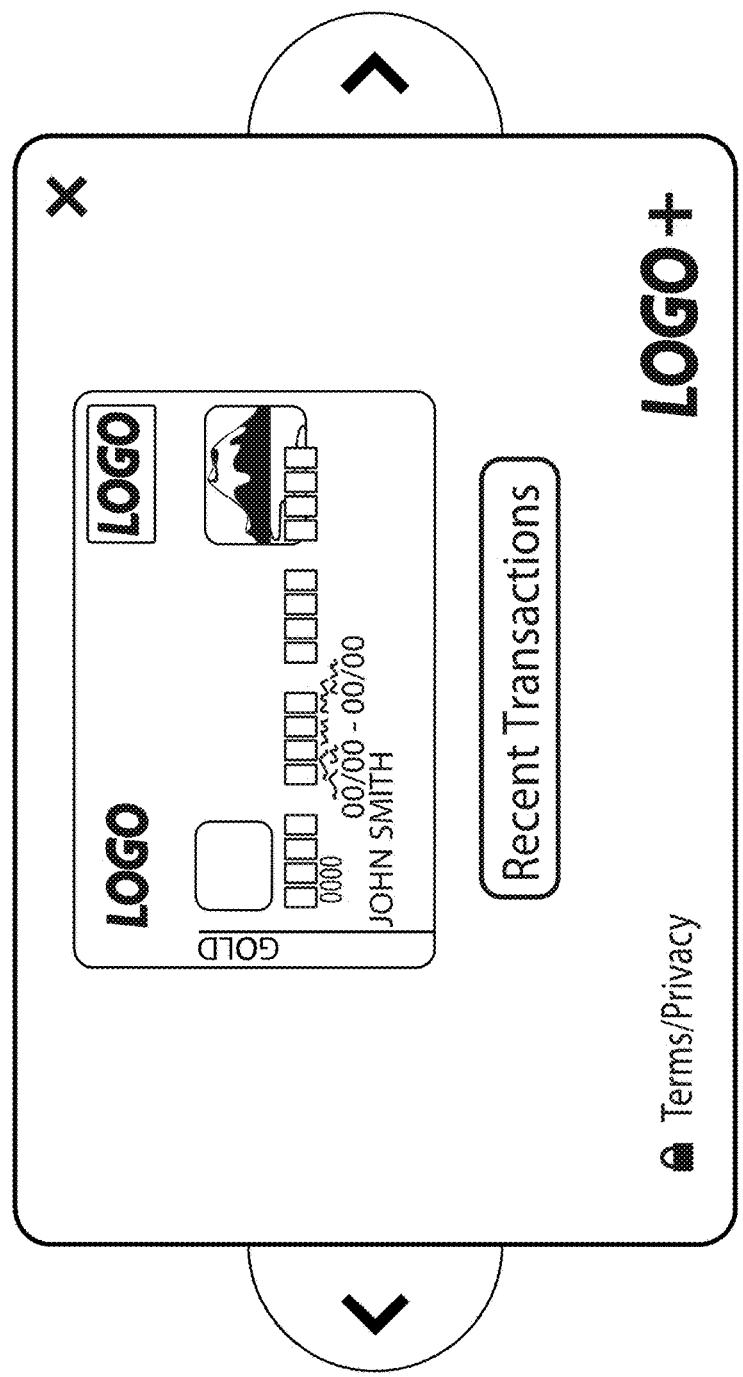
FIG. 16 is an illustration of a sample display for transaction information.
Figure 17A:
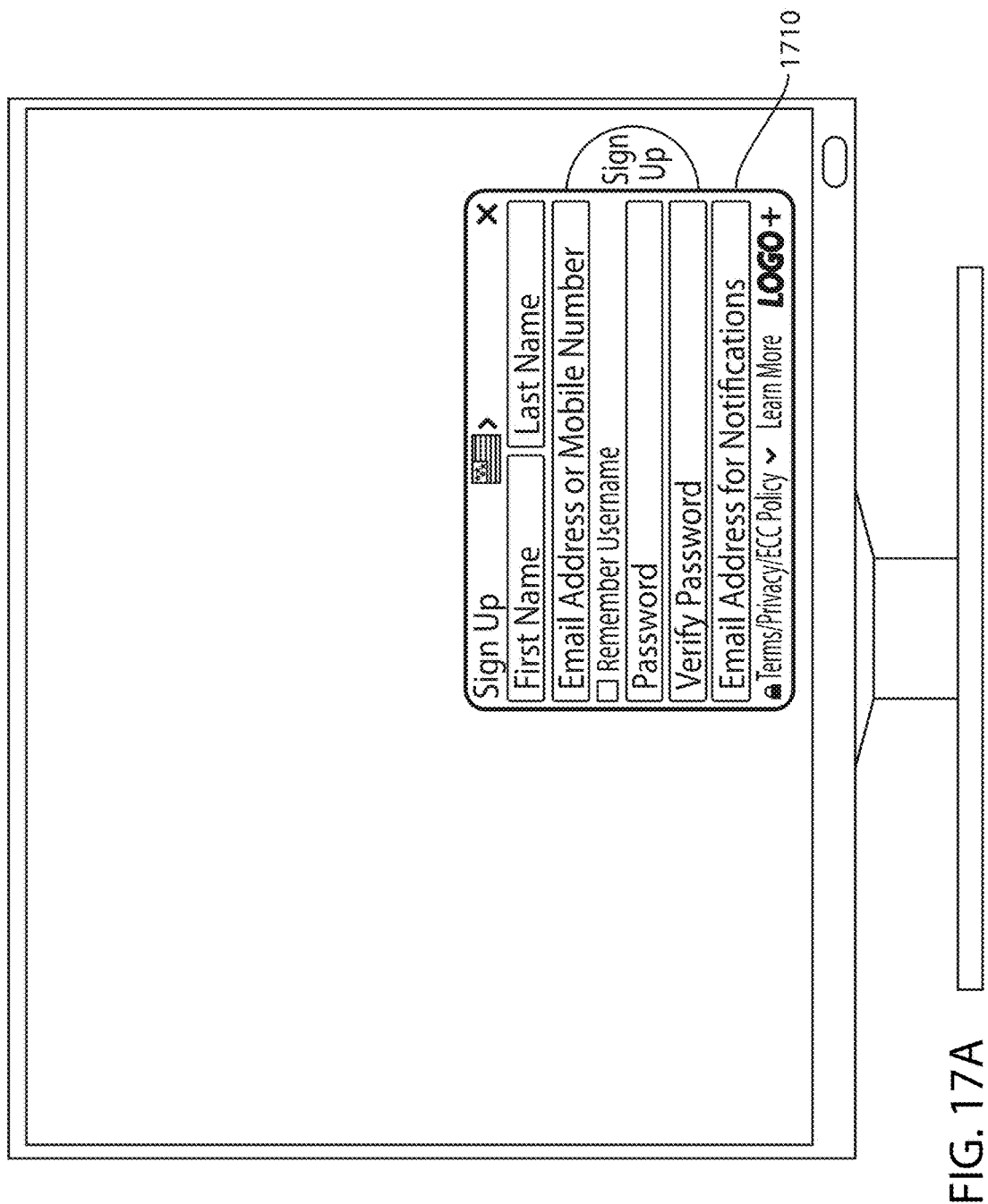
FIG. 17A-17D are illustrations of the sample displays as they appear on various computing devices.
Figure 17B:
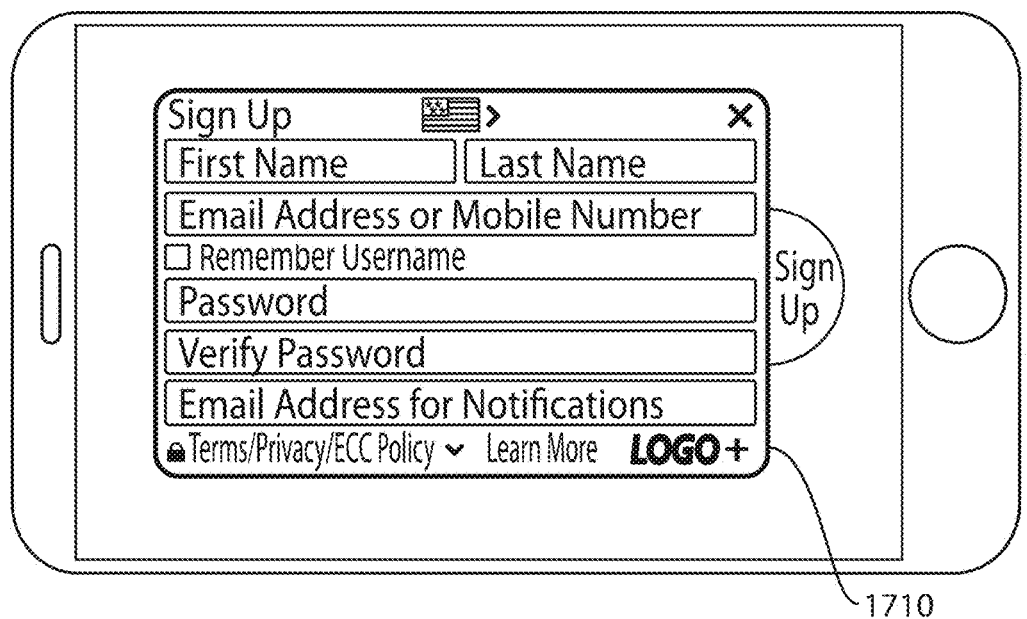
Figure 17C:
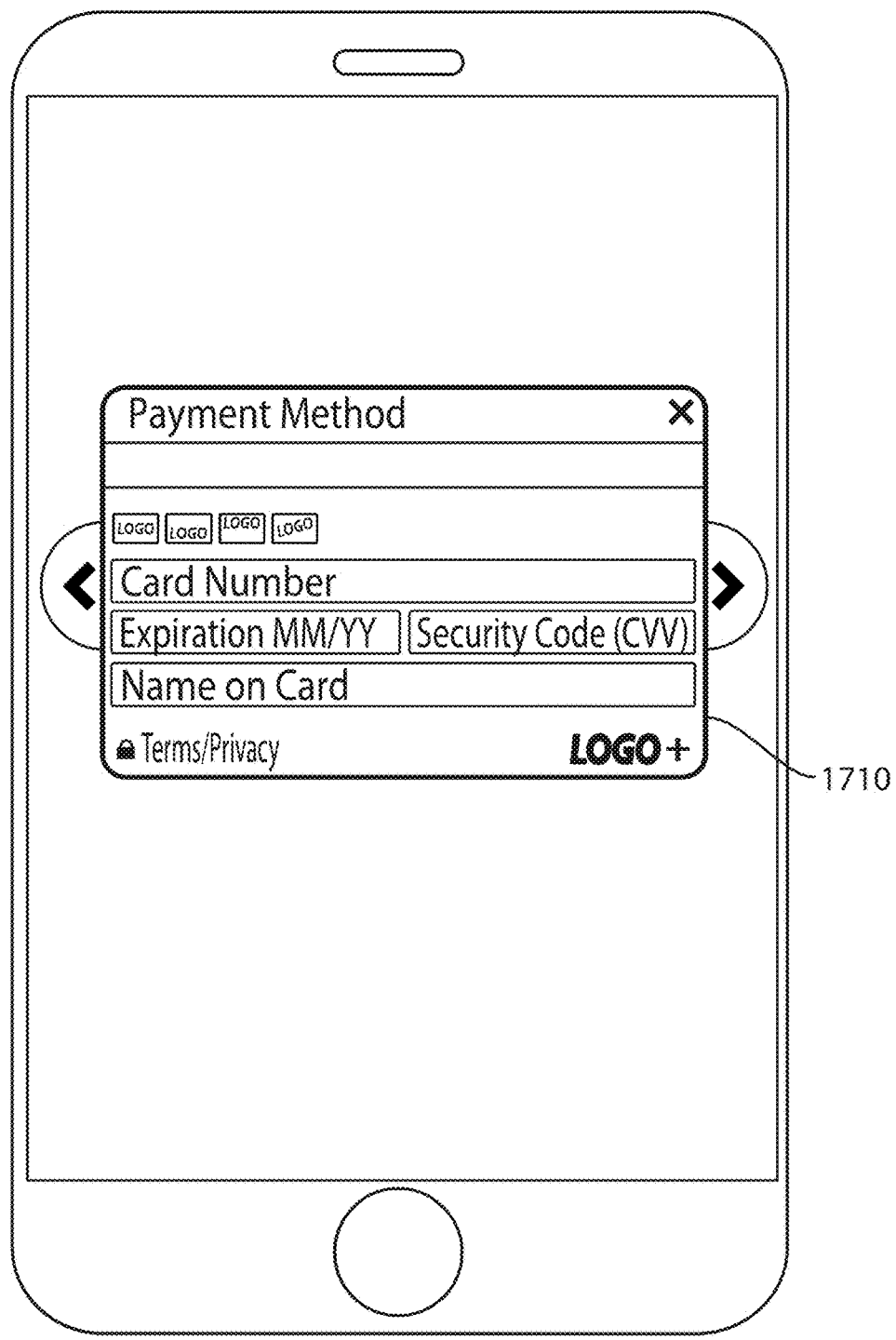
Figure 17D:
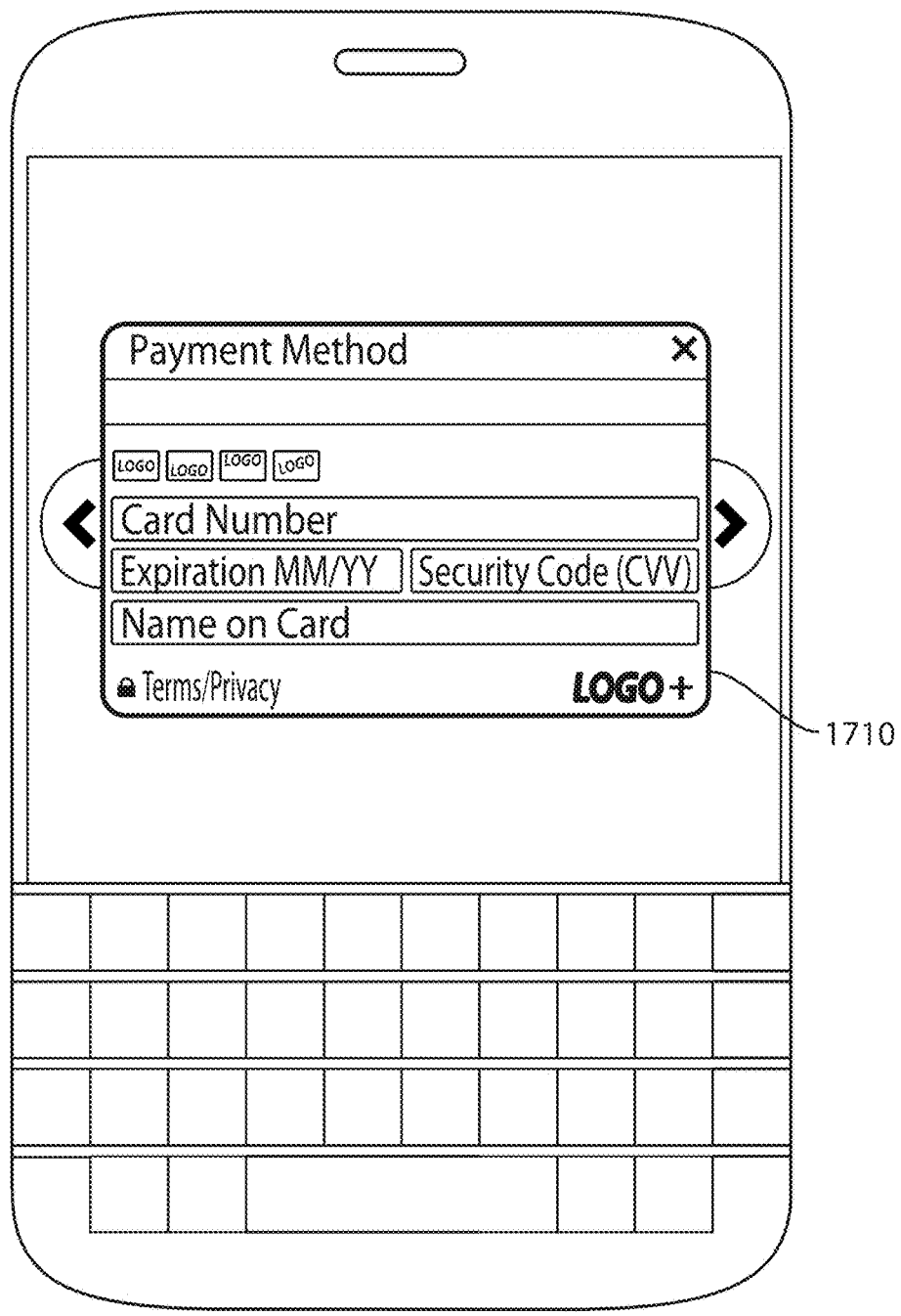

In some embodiments, it may be possible to review recent transactions made using the graphical user interface through additional screens. For example, FIG. 16 is an illustration of a sample display for transaction information through which the user may navigate to recent purchases made with a particular card.

FIGS. 17A-17D are illustrations of the sample displays as they appear on various computing devices. The graphical user interface may be used with any computing device such as desktop, or laptop computing devices and mobile devices. The graphical user interface 1710 may be displayed at any size relative to the display screen, but a preferred embodiment is that this graphical user interface 1710 appears at a size that corresponds to the size of the user's physical cards.

Figure 18:
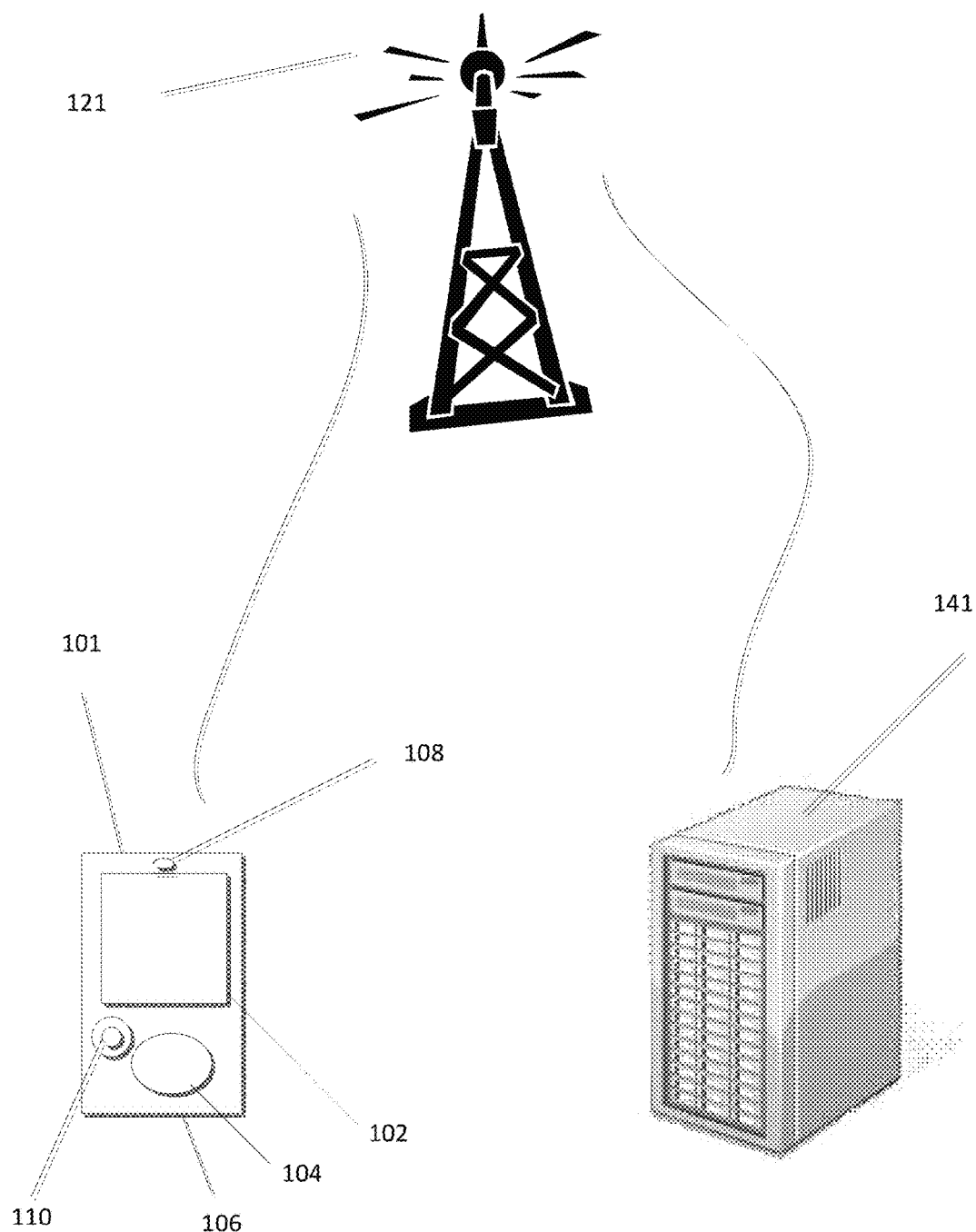
FIG. 18 is an illustration of a sample computing environment physically configured to execute the embodiments of the method.
Figure 19:
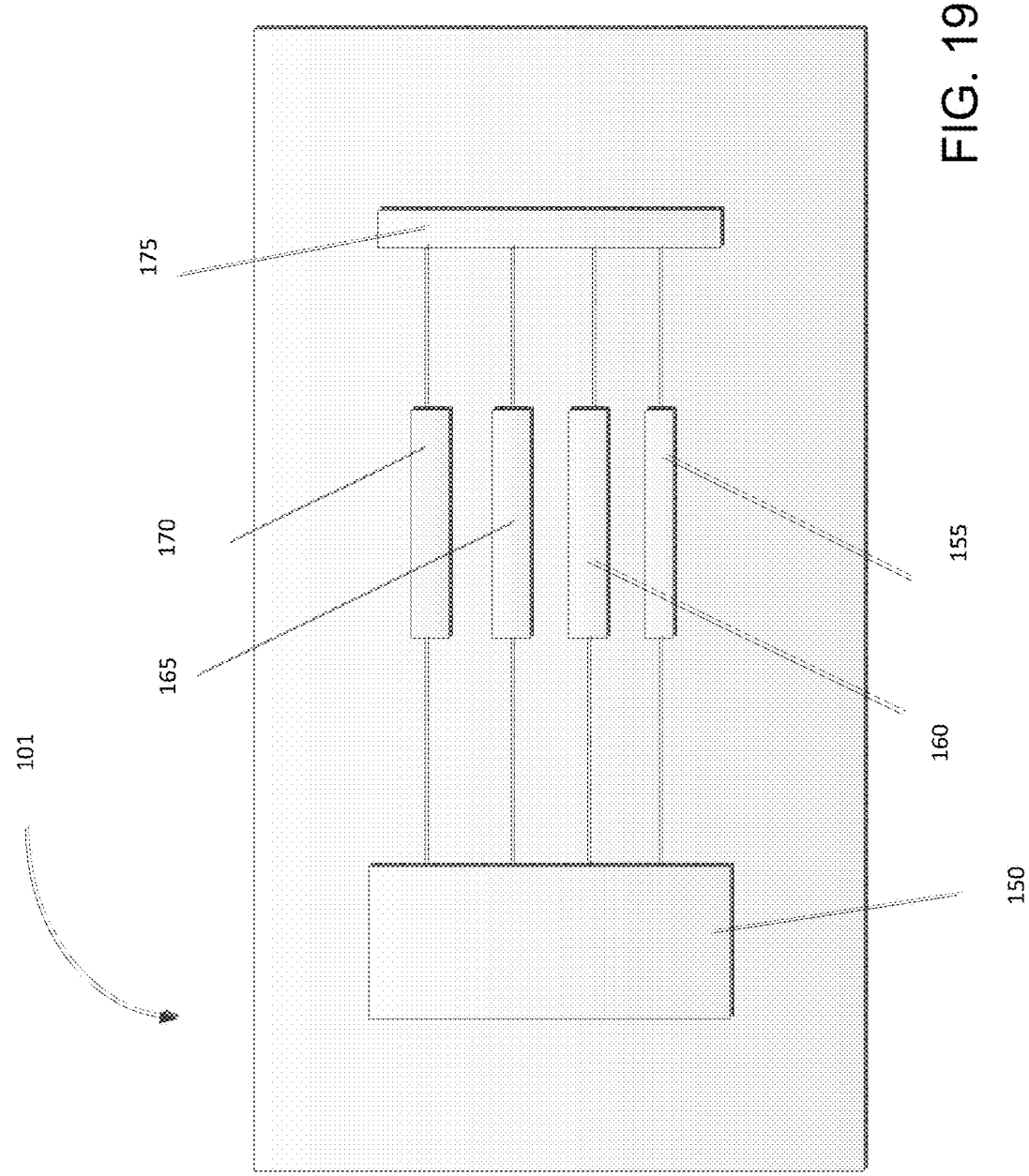
FIG. 19 is an illustration of a portable computing device which is physically configured according to embodiments of the method.

FIG. 18 may be a high level illustration of some of the elements in a sample computing system that may be physically configured to execute the various embodiments of the method. The computing system may be a dedicated computing device 141, a dedicated portable computing device 101, an application on the computing device 141, an application on the portable computing device 101 or a combination of all of these. FIG. 19 may be a high level illustration of a portable computing device 101 communicating with a remote computing device 141 through a communication device 121 but the application may be stored and accessed in a variety of ways. In addition, the application may be obtained in a variety of ways such as from an app store, from a web site, from a store WiFi system, etc. There may be various versions of the application to take advantage of the benefits of different computing devices, different computing languages and different API platforms.

In one embodiment, a portable computing device 101 may be a device that operates using a portable power source 155 such as a battery (FIG. 19). Referring to FIG. 18, the portable computing device 101 may also have a display 102 which may or may not be a touch sensitive display. More specifically, the display 102 may have a capacitance sensor, for example, that may be used to provide input data to the portable computing device 101. In other embodiments, an input pad 104 such as arrows, scroll wheels, keyboards, etc., may be used to provide inputs to the portable computing device 101. In addition, the portable computing device 101 may have a microphone 106 which may accept and store verbal data, a camera 108 to accept images and a speaker 110 to communicate sounds.

The portable computing device 101 may be able to communicate with a computing device 141 or a plurality of computing devices 141 that make up a cloud of computing devices 111 through a communication device 121. The portable computing device 101 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the computing device 141 or may be through a communication device or network of devices 121 such as cellular service, through the Internet, through a private network, through Bluetooth, through near field communications, etc. FIG. 19 may be a simplified illustration of the physical elements that make up a portable computing device 101 and FIG. 20 may be a simplified illustration of the physical elements that make up a server type computing device 141.

Referring to FIG. 19, a sample portable computing device 101 may be physically configured according to a method to be part of the system. The portable computing device 101 may have a processor 150 that is physically configured according to computer executable instructions. It may have a portable power supply 155 such as a battery which may be rechargeable. It may also have a sound and video module 160 which assists in displaying video and sound and may turn off when not in use to conserve power and battery life. The portable computing device 101 may also have volatile memory 165 and non-volatile memory 170. There also may be an input/output bus 175 that shuttles data to and from the various user input devices such as the microphone 106, the camera 108 and other inputs 102, etc. It also may control of communicating with the networks, either through wireless or wired devices. Of course, this is just one embodiment of the portable computing device 101 and the number and types of portable computing devices 101 is limited only by the imagination. The portable computing device 101 may act as the display 102 or may be a part of the display 102.

The physical elements that make up the remote computing device 141 may be further illustrated in FIG. 20. At a high level, the computing device 141 may include a digital storage such as a magnetic disk, an optical disk, flash storage, non-volatile storage, etc. Structured data may be stored in the digital storage such as in a database. The server 141 may have a processor 300 that is physically configured according to computer executable instructions. It may also have a sound and video module 305 which assists in displaying video and sound and may turn off when not in use to conserve power and battery life. The server 141 may also have volatile memory 310 and non-volatile memory 315.

The database 325 may be stored in the memory 310 or 315 or may be separate. The database 325 may also be part of a cloud of computing device 141 and may be stored in a distributed manner across a plurality of computing devices 141. There also may be an input/output bus 320 that shuttles data to and from the various user input devices such as the microphone 106, the camera 108, the inputs 102, etc. The input/output bus 320 also may control of communicating with the networks, either through wireless or wired devices. In some embodiments, the application may be on the local computing device 101 and in other embodiments, the application may be remote 141. Of course, this is just one embodiment of the server 141 and the number and types of computing devices 141 is limited only by the imagination.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A computer-implemented method for providing a graphical user interface (GUI) for processing an electronic transaction on an input screen via a mobile application, the method comprising:
displaying a first GUI screen of the GUI in a shape and a surface appearance resembling a payment card, said first GUI screen resembling the payment card having two shorter edges, wherein the first GUI screen includes one or more first input fields;
generating and displaying a semi-circle oval protruding outwardly from at least one of the two shorter edges of the first GUI screen;
receiving first inputs in the one or more first input fields on the first GUI screen, wherein the one or more first input fields are displayed within the shape and surface appearance resembling the payment card;
wherein the received first inputs are sent to an electronic transaction server;
in response to receiving the first inputs, generating and displaying a first dynamic GUI indication in the semi-circle oval in response to some or all of the first inputs for the one or more first input fields being received while received inputs in the one or more first input fields are persistently displayed, wherein the first dynamic GUI indication comprises: color changes when some or all of the first inputs for the one or more first input fields receive input, an arrow indication only appearing in the semi-circle oval upon completion of the some or all of the first inputs for the one or more first input fields configured to be activated to move to second GUI screen, or an error message to be displayed in the first GUI screen instead of the arrow indication;
receiving a first activation of the first dynamic GUI indication;
in response to receiving the first activation of the first dynamic GUI indication, transitioning from the first GUI screen to the second GUI screen, said transitioning comprising replacing the first GUI screen with the second GUI screen, said second GUI screen displaying one or more second input fields for inputs within the second GUI screen having the shape and surface appearance resembling the payment card;
receiving second inputs in the one or more second input fields that provide complete information for the electronic transaction;
wherein the received second inputs are sent to the electronic transaction server;
in response to receiving the second inputs, generating a second dynamic GUI indication in the semi-circle oval;
receiving a second activation of the second dynamic GUI indication;
transitioning from the second GUI screen to at least one GUI confirmation screen, said transitioning comprising replacing the second GUI screen with the at least one GUI confirmation screen, wherein the at least one GUI confirmation screen indicates completion of inputs received for the electronic transaction; and
receiving a final activation of a third dynamical GUI indication in the semi-circle oval for the at least one GUI confirmation screen to execute the electronic transaction, wherein the received final activation is sent to the electronic transaction server to execute the electronic transaction.

2. The computer-implemented method of claim 1, further comprising:
displaying an error message when all of the first inputs or the second inputs are not received.

3. The computer-implemented method of claim 1, wherein the payment card comprises one of a credit card, debit card, checking card, smart card, or loyalty card.

4. The computer-implemented method of claim 1, further comprising:
displaying a sign-up screen in the shape and the surface appearance resembling the payment card;
receiving sign-up inputs in fields of the sign-up screen; and
displaying a GUI indication to transition to the at least one GUI confirmation screen when the fields of the sign-up screen have been completed.

5. The computer-implemented method of claim 1, further comprising:
displaying a sign-in screen in the shape and the surface appearance resembling the payment card;

receiving sign-in inputs in fields of the payment card; and
displaying a GUI indication to move to the at least one GUI confirmation screen when the fields have been completed.

6. The computer-implemented method of claim 1, wherein the at least one GUI confirmation screen includes an image of the payment card.

7. The computer-implemented method of claim 1, further comprising:
receiving a request to complete a transaction based on the received first inputs and the received second inputs.

8. The computer-implemented method of claim 7, further comprising:
displaying a receipt screen as the at least one GUI confirmation screen upon receiving an indication that the received request to complete a transaction has been accepted.

9. A system for providing a graphical user interface (GUI) for processing an electronic transaction on an input screen via a mobile application, the system comprising:
a front-end server having a processor configured for executing computer-executable instructions for:
providing a first GUI screen of the GUI on a user device in a shape and a surface appearance resembling a payment card, said first GUI screen resembling the payment card having two shorter edges, wherein the first GUI screen includes one or more first input fields; wherein the processor further stores input data of the one or more first input fields in a memory connected to an electronic transaction server via a network connection;
displaying a semi-circle oval protruding outwardly from at least one of the two shorter edges of the first GUI screen;
receiving first inputs via the GUI of the user device in the one or more first input fields on the first GUI screen, wherein the one or more first input fields are displayed within the shape and surface appearance resembling the payment card;
transmitting the received first inputs to the electronic transaction server;
in response to receiving the first inputs, displaying a first dynamic GUI indication in the semi-circle oval on the user device in response to some or all of the first inputs for the one or more first input fields being received while received inputs in the one or more first input fields are persistently displayed, wherein the first dynamic GUI indication comprises: color changes when some or all of the first inputs for the one or more first input fields receive input, an arrow indication only appearing in the semi-circle oval upon completion of the some or all of the first inputs for the one or more first input fields configured to be activated to move to second GUI screen, or an error message to be displayed in the first GUI screen instead of the arrow indication;
receiving a first activation of the first dynamic GUI indication;
in response to receiving the first activation of the first dynamic GUI indication, transitioning from the first GUI screen to the second GUI screen of the GUI of the user device, wherein the processor replaces the first GUI screen with the second GUI screen, said second GUI screen displaying one or more second input fields for inputs within the second GUI screen having the shape and surface appearance resembling the payment card;
receiving second inputs in the one or more second input fields on the GUI of the user device that provide complete information for the electronic transaction;
wherein the processor transmits the received second inputs to the electronic transaction server;
in response to receiving the second inputs, displaying a second dynamic GUI indication in the semi-circle oval;
receiving a second activation of the second dynamic GUI indication;
transitioning from the second GUI screen to at least one GUI confirmation screen, wherein the processor replaces the second GUI screen with the at least one GUI confirmation screen, wherein the at least one GUI confirmation screen indicates completion of inputs received for the electronic transaction; and
receiving a final activation of a third dynamical GUI indication in the semi-circle oval for the at least one GUI confirmation screen to execute the electronic transaction, wherein the received final activation is sent to the electronic transaction server to execute the electronic transaction.

10. The system of claim 9, further comprising displaying an error message when all of the first inputs or the second inputs are not received.

11. The system of claim 9, wherein the payment card comprises one of a credit card, debit card, checking card, smart card, or loyalty card.

12. The system of claim 9, further comprising:
displaying a sign-up screen in the shape and the surface appearance resembling the payment card;
receiving sign-up inputs in fields of the sign-up screen; and
displaying a GUI indication to transition to the at least one GUI confirmation screen when the fields of the sign-up screen have been completed.

13. The system of claim 9, further comprising:
displaying a sign-in screen in the shape and the surface appearance resembling the payment card;
receiving sign-in inputs in fields of the payment card; and
displaying a GUI indication to move to the at least one GUI confirmation screen when the fields have been completed.

14. The system of claim 9, wherein the at least one GUI confirmation screen includes an image of the payment card.

15. The system of claim 9, further comprising:
receiving a request to complete a transaction based on the received first inputs and the received second inputs.

16. The system of claim 15, further comprising:
displaying a receipt screen as the at least one GUI confirmation screen upon receiving an indication that the received request to complete a transaction has been accepted.

17. A non-transitory computer-readable medium storing computer-executable instructions for providing a graphical user interface (GUI) for processing an electronic transaction on an input screen via a mobile application, the computer-executable instructions comprising:
displaying a first GUI screen of the GUI in a shape and a surface appearance resembling a payment card, said first GUI screen resembling the payment card having two shorter edges, wherein the first GUI screen includes one or more first input fields;
generating and displaying a semi-circle oval protruding outwardly from at least one of the two shorter edges of the first GUI screen;
receiving first inputs in the one or more first input fields on the first GUI screen, wherein the one or more first input fields are displayed within the shape and surface appearance resembling the payment card;

wherein the received first inputs are sent to an electronic transaction server;

in response to receiving the first inputs, generating and displaying a first dynamic GUI indication in the semi-circle oval in response to some or all of the first inputs for the one or more first input fields being received while received inputs in the one or more first input fields are persistently displayed, wherein the first dynamic GUI indication comprises: color changes when some or all of the first inputs for the one or more first input fields receive input, an arrow indication only appearing in the semi-circle oval upon completion of the some or all of the first inputs for the one or more first input fields configured to be activated to move to second GUI screen, or an error message to be displayed in the first GUI screen instead of the arrow indication;

receiving a first activation of the first dynamic GUI indication;

in response to receiving the first activation of the first dynamic GUI indication, transitioning from the first GUI screen to the second GUI screen, said transitioning comprising replacing the first GUI screen with the second GUI screen, said second GUI screen displaying one or more second input fields for inputs within the second GUI screen having the shape and surface appearance resembling the payment card;

receiving second inputs in the one or more second input fields that provide complete information for the electronic transaction;

wherein the received second inputs are sent to the electronic transaction server;

in response to receiving the second inputs, generating a second dynamic GUI indication in the semi-circle oval;

receiving a second activation of the second dynamic GUI indication;

transitioning from the second GUI screen to at least one GUI confirmation screen, said transitioning comprising replacing the second GUI screen with the at least one GUI confirmation screen, wherein the at least one GUI confirmation screen indicates completion of inputs received for the electronic transaction; and receiving a final activation of a third dynamical GUI indication in the semi-circle oval for the at least one GUI confirmation screen to execute the electronic transaction, wherein the received final activation is sent to the electronic transaction server to execute the electronic transaction.

18. The non-transitory computer-readable medium of claim 17, further comprising:
displaying a sign-up screen in the shape and the surface appearance resembling the payment card;
receiving sign-up inputs in fields of the sign-up screen; and
displaying a GUI indication to transition to the at least one GUI confirmation screen when the fields of the sign-up screen have been completed.

19. The non-transitory computer-readable medium of claim 17, further comprising:
displaying a sign-in screen in the shape and the surface appearance resembling the payment card;
receiving sign-in inputs in fields of the payment card; and
displaying a GUI indication to move to the at least one GUI confirmation screen when the fields have been completed.

20. The non-transitory computer-readable medium of claim 17, wherein the computer-executable instructions further comprising:
displaying a receipt screen as the at least one GUI confirmation screen upon receiving an indication that the received request to complete a transaction has been accepted.

* * * * *